Jan. 19, 1937.   R. F. KNEISLEY   2,068,332
METHOD AND MEANS OF COLLECTING DUST FROM AN AIR CURRENT
Filed June 24, 1936
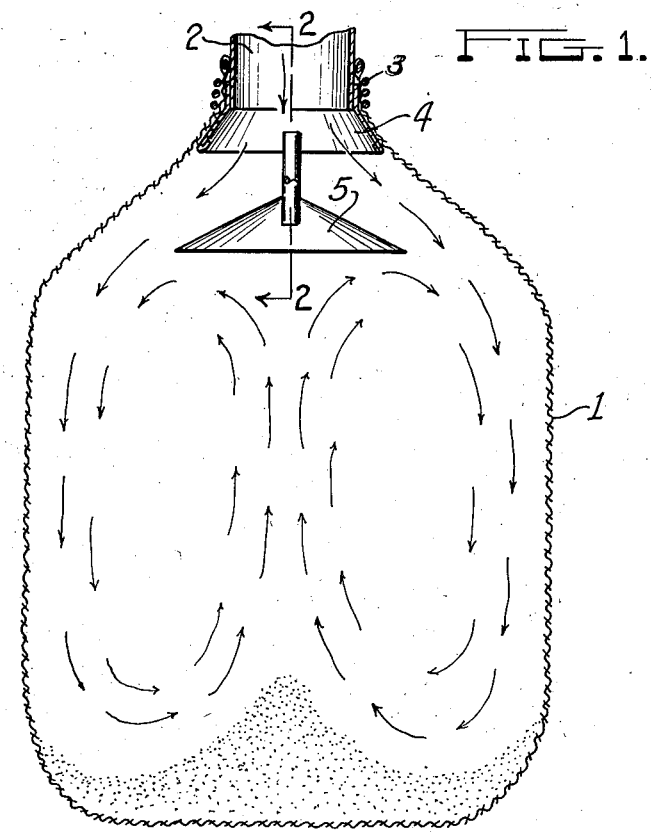
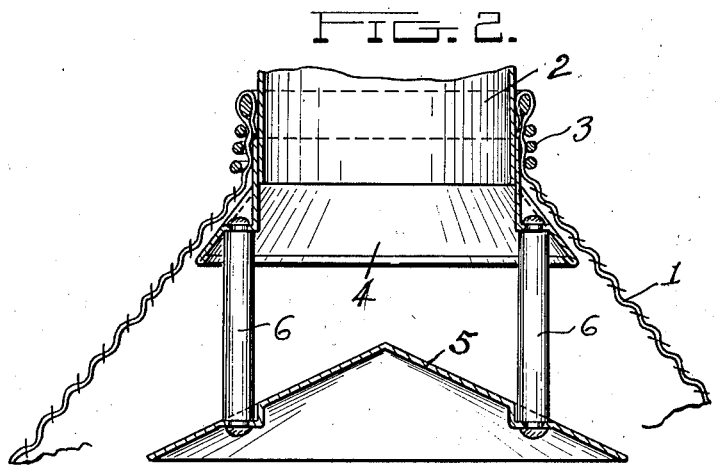
Inventor
Richard F. Kneisley
By  Owen & Owen
Attorneys.

Patented Jan. 19, 1937

2,068,332

UNITED STATES PATENT OFFICE 2,068,332

METHOD AND MEANS OF COLLECTING DUST FROM AN AIR CURRENT

Richard F. Kneisley, Toledo, Ohio, assignor to The American Floor Surfacing Machine Company, Toledo, Ohio, a corporation of Ohio Application June 24, 1936, Serial No. 86,929

5 Claims. (Cl. 183—67)

This invention relates to pneumatic dust collectors, and particularly to those used in connection with sanding machines carpet cleaners, and the like.

In dust collectors of this type commonly used, it is customary for the dust laden air current to be directed into porous dust collecting bags in such manner that the dust, in being extracted from the air in the passage of the latter outwardly from the bag through its porous side walls, rapidly accumulates and builds up a coating on such walls which is more or less impervious to the passage of air therethrough, thus reducing the efficiency and dust collecting capacity of the machine greatly out of proportion to the size of the bag and the dust collecting capacity thereof if its walls are kept clean, and necessitating frequent cleaning of the bag.

The object of the present invention is to overcome the above objections by the provision of a method and means for directing dust laden air into dust collecting receivers of a porous nature, whereby the collection of dust on the receiver walls, the consequent closing of the wall pores and reduction of the air flow therethrough, and the diminishing of the dust collecting capacity of the receiver is reduced to a minimum.

The invention is fully described in the following specification, and a preferred embodiment thereof illustrated in the accompanying drawing, in which—

Figure 1 is a central vertical section of a dust collecting bag and the end of an air conduit to which attached, illustrating the means embodying the invention and the course of the dust laden air current directed into the bag, and Fig. 2 is an enlarged fragmentary section thereof taken on the line 2—2 in Fig. 1.

Referring to the drawing, 1 designates a dust collecting bag and 2 the outlet end of a conduit to which the bag is attached and which leads to the bag from any suitable source of supply, as well understood in the art.

The bag 1 is of the customary porous nature which causes a cleaning or extraction of the dust from the air as it filters therethrough. The mouth of the bag is restricted relative to its body portion and is adapted to receive and fit around the discharge end of the conduit 2, being removably held thereto by a clamp or band 3, or in any other suitable manner. It is found in practice that if the dust laden air from the conduit 2 is directed centrally down into the bag, the current will be substantially the reverse to that indicated by arrows in Fig. 1, so that the lighter particles of dust will be carried up along the inner side walls of the bag and deposited thereon as the air passes outwardly through the pores of the side walls. This accumulation of dust on such walls will rapidly act to close the pores of the bag and to diminish the air filtering capacity thereof, thus not only necessitating frequent cleaning but causing a backing up and diminishing of the force of the dust collecting current through the conduit.

The purpose of the present invention is to so direct the dust laden air discharge into the dust collecting bag as to cause the air to sweep the side walls of the bag throughout substantially the entire length thereof and thus act to prevent the accumulation of dust particles thereon, or at least to reduce such accumulation to a minimum. By doing this, it is found in practice that the capacity of a bag for collecting dust is materially increased, and that less frequent cleaning or replacing of bags is required.

In carrying out the invention, the discharge end of the conduit 2 is preferably provided with an outwardly flaring mouth-piece 4 of a stiff material to maintain its flaring shape, such flaring in the present instance being of conical form. This flaring mouth-piece coacts with the outwardly and downwardly tapering neck portion of the bag and tends to keep it partially distended. Without the mouth-piece 4 in axially spaced relation thereto is a conical deflector plate 5, which has its apex disposed upwardly or toward the discharge end of the conduit. The outer edge of this deflector is spaced from the neck wall of the bag when the latter is distended and preferably is disposed in a plane which is above the point of merging of the neck into the cylindrical body portion of the bag. It is found that the best results are obtained by this arrangement. The deflector is suspended from the mouth-piece 4 by posts 6 which rigidly connect the members one to the other in axially spaced relation.

The air current directed into the bag from the conduit 2 strikes the deflector 5 and is deflected thereby outwardly to the wall of the flaring neck portion of the bag and thence follows down along the side wall of the bag body sweeping any accumulated particles therefrom, and at the bottom of the bag the air current swerves inward and thence upward through the central portion thereof. This action causes the dust to accumulate in the bottom of the bag body leaving the major portion of the side wall free, as indicated by the arrow in Fig. 1.

This manner of directing the air into the bag prevents the stoppage of the pores in the neck portion and side wall of the bag by the accumulation of dust thereon and permits the normal passage of the air through such wall, so that the force of the dust collecting air current through the conduit 2 and into the bag maintains substantially its full strength until the dust has accumulated to such an extent in the bottom of the bag and risen to a height therein that will materially reduce the effective exposed air filtering area of the bag.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. The method of extracting dust from air directed into a porous walled dust collecting bag, which consists in discharging dust laden air into the mouth of the bag, deflecting such air to have its discharge outwardly against the side wall of the bag adjacent to its mouth and thence down along such wall in sweeping engagement therewith throughout a substantial portion of its area to remove dust particles therefrom, the air current at the bottom portion being swerved inwardly to and upwardly through the central portion of the bag.

2. In combination, a conduit through which dust laden air is discharged and having an open discharge end, a porous walled dust collecting bag having its mouth receiving end attached to the discharge end of said conduit, and a deflector disposed within the receiving end of the bag adjacent to the discharge end of said conduit in the path of discharge of air therefrom and causing an outward and downward conical deflection of the discharging air current against the upper side wall portion of the bag and to then continue in sweeping relation down the side wall of the bag to near its bottom to prevent the accumulation of dust particles thereon.

3. In combination, a conduit from which dust laden air is discharged and having an open discharge end, a porous walled dust collecting bag having its mouth in open communication with the discharge end of said conduit, said bag having a neck portion flaring outwardly and downwardly from its mouth portion and merging into a substantially straight downwardly extending side wall portion, a deflector within the neck portion of the bag adjacent to the discharge end of the conduit and in the path of air discharge therefrom to conically deflect the discharging dust laden air outwardly and downwardly against the flaring wall of the bag neck and thence in sweeping relation down such wall and the side wall of said body portion to near its bottom.

4. In combination, a conduit through which dust laden air is discharged, said conduit having an outwardly flaring discharge end, a porous walled dust collecting bag having its mouth attached to the discharge end of said conduit with the flared discharge end portion of the latter extending into the neck portion of the bag, said bag having an outwardly and downwardly flaring neck portion and a downwardly extending body portion, a conical deflector attached to the discharge end of the conduit in outwardly spaced centrally aligned relation thereto, with its apex directed toward the conduit, whereby air discharging from the conduit is directed by the deflector outwardly against the side wall of the neck and thence in contacting sweeping relation down said wall and the side wall of the body portion of the bag to near the bottom thereof, the lower edge of the deflector being disposed above the plane of merging of the neck wall into the body wall of the bag.

5. The method of extracting dust from air directed into a porous walled dust collecting bag, which consists in discharging dust laden air into the mouth of the bag, deflecting such air to have its discharge outwardly against the side wall of the bag adjacent to its mouth and around its center, and thence in prolonged sweeping engagement along such wall to near its opposite end in enveloping relation to the central interior space of the bag, and at said opposite end swerving the air current into and through said central space.

RICHARD F. KNEISLEY.